(12) United States Patent
Lyfar

(10) Patent No.: US 11,562,832 B2
(45) Date of Patent: Jan. 24, 2023

(54) CONDUCTOR ARRANGEMENT FOR AN ELECTRICAL ENERGY AND/OR DATA TRANSMISSION CONNECTION

(71) Applicant: DEERE & COMPANY, Moline, IL (US)

(72) Inventor: Dimitrij Lyfar, Aschaffenburg (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/447,779

(22) Filed: Sep. 15, 2021

(65) Prior Publication Data

US 2022/0005628 A1   Jan. 6, 2022

Related U.S. Application Data

(62) Division of application No. 16/750,792, filed on Jan. 23, 2020, now abandoned.

(30) Foreign Application Priority Data

Feb. 1, 2019   (DE) .......................... 102019201339.2

(51) Int. Cl.
*H01B 7/18* (2006.01)
*H01B 7/00* (2006.01)
(Continued)

(52) U.S. Cl.
CPC ......... *H01B 7/1805* (2013.01); *H01B 7/0009* (2013.01); *H01B 7/04* (2013.01);
(Continued)

(58) Field of Classification Search
CPC ........ H01B 7/1805; H01B 7/184; H01B 7/04; H01B 7/0009; H01B 7/28; H01B 7/187;
(Continued)

(56) References Cited

U.S. PATENT DOCUMENTS 5,831,215 A   11/1998  Ziemek et al.
6,060,663 A    5/2000  Hier et al.
(Continued)

FOREIGN PATENT DOCUMENTS

DE   102008035169 B3   1/2010
DE   102017208292 A1   11/2017
(Continued)

OTHER PUBLICATIONS

European Search Report issued in EP application No. 20153567.1, dated Jun. 19, 2020, 6 pages.

*Primary Examiner* — Paresh Paghadal

(57) ABSTRACT

A conductor arrangement for an electrical connection includes a flexible multi-core internal conductor, an electromagnetic shield surrounding the flexible multi-core internal conductor, a thermoplastic hard plastic sheath surrounding a first portion of the flexible multi-core internal conductor, and a flexible corrugated tube surrounding a second portion the flexible multi-core internal conductor. A first portion of the thermoplastic hard plastic sheath includes an elongated flattened shape. A second portion of the thermoplastic hard plastic sheath includes an essentially round shape. The second portion of the thermoplastic hard plastic sheath is adjacent the first portion of the thermoplastic hard plastic sheath.

5 Claims, 5 Drawing Sheets

(51) Int. Cl.
*H02G 3/04* (2006.01)
*B60R 16/02* (2006.01)
*H01B 7/04* (2006.01)
*H01B 7/02* (2006.01)
*H01B 7/16* (2006.01)
*H01B 7/17* (2006.01)
*H01B 7/28* (2006.01)
*H01B 9/04* (2006.01)
*H01B 13/012* (2006.01)
*H01B 17/56* (2006.01)
*H01B 17/58* (2006.01)
*H01B 17/60* (2006.01)

(52) U.S. Cl.
CPC ........... *H01B 7/184* (2013.01); *H02G 3/0481* (2013.01); *H02G 3/0487* (2013.01); *B60R 16/0207* (2013.01); *B60R 16/0215* (2013.01); *H01B 7/0045* (2013.01); *H01B 7/0081* (2013.01); *H01B 7/02* (2013.01); *H01B 7/0275* (2013.01); *H01B 7/16* (2013.01); *H01B 7/17* (2013.01); *H01B 7/18* (2013.01); *H01B 7/187* (2013.01); *H01B 7/28* (2013.01); *H01B 9/04* (2013.01); *H01B 13/012* (2013.01); *H01B 13/01254* (2013.01); *H01B 17/56* (2013.01); *H01B 17/58* (2013.01); *H01B 17/60* (2013.01)

(58) Field of Classification Search
CPC ... H01B 7/16; H01B 7/17; H01B 7/18; H01B 7/02; H01B 7/0275; H01B 7/0045; H01B 7/0081; H01B 17/56; H01B 17/58; H01B 17/60; H01B 9/04; H02G 3/0481; H02G 3/0487; B60R 16/0215; B60R 16/0207
See application file for complete search history.

(56) References Cited

U.S. PATENT DOCUMENTS

| | | |
|---|---|---|
| 10,647,270 B2 | 5/2020 | Yanazawa et al. |
| 2013/0014988 A1 | 1/2013 | Sato et al. |
| 2013/0160460 A1 | 6/2013 | Dalton et al. |
| 2013/0161093 A1* | 6/2013 | Broughton ............... F02C 7/32 174/72 A |
| 2015/0136483 A1 | 5/2015 | Inao et al. |
| 2015/0217708 A1 | 8/2015 | Adachi et al. |
| 2015/0274095 A1* | 10/2015 | Inao .................... H02G 3/0468 174/72 A |
| 2015/0294764 A1* | 10/2015 | Adachi ............... H02G 3/0468 174/113 R |
| 2015/0310968 A1 | 10/2015 | Murata et al. |
| 2016/0114742 A1 | 4/2016 | Suguro et al. |
| 2016/0200269 A1 | 7/2016 | Inoue et al. |
| 2016/0276064 A1 | 9/2016 | Suguro et al. |
| 2016/0325699 A1 | 11/2016 | Yoshida et al. |
| 2017/0036620 A1* | 2/2017 | Nagahashi ........... H02G 3/0462 |
| 2019/0089142 A1* | 3/2019 | Sugino ................ B60R 16/0215 |
| 2019/0126861 A1* | 5/2019 | Nakai ..................... H02G 3/04 |
| 2019/0312439 A1 | 10/2019 | Cottrell et al. |
| 2021/0166835 A1* | 6/2021 | Olwage ................ H01B 7/1825 |

FOREIGN PATENT DOCUMENTS

| | | |
|---|---|---|
| DE | 102018211962 A1 | 1/2019 |
| EP | 2879239 A1 | 6/2015 |

\* cited by examiner

CONDUCTOR ARRANGEMENT FOR AN ELECTRICAL ENERGY AND/OR DATA TRANSMISSION CONNECTION

RELATED APPLICATIONS

This application is a divisional of U.S. patent application Ser. No. 16/750,792, filed Jan. 23, 2020, which claims the benefit of and priority to German Patent Application Ser. No. 102019201339.2, filed Feb. 1, 2019, the disclosures of which are hereby incorporated by reference.

FIELD OF THE DISCLOSURE

The present disclosure relates to a conductor arrangement for an electrical energy or data transmission connection, and in particular to a connection having at least one conductor portion with a flexible internal conductor.

BACKGROUND

Conventional conductor arrangements are known in a wide range of embodiments. Cable clips or additional guide tubes are usually used for the purpose of fixed installation. In addition, the use of rigid solid conductors instead of flexible conductors is also usual for fixedly installed energy transmission connections, wherein said conductors are bent into a respectively desired shape before being installed.

In addition, with a view to simplifying the assembly thereof, an energy supply rail consisting of flexible and rigid portions, such as known from DE 10 2008 035 169 B3, is provided.

There is a need, however, to adapt a conventional conductor arrangement to a fixed installation.

SUMMARY

In the present disclosure, one embodiment of a conductor arrangement for an electrical energy or data transmission connection may include at least one conductor portion having a flexible internal conductor, wherein the flexible internal conductor is surrounded by a thermoplastic hard plastic sheath which can be transformed into a formable state by heating to a threshold temperature $T_g$ provided by a specific softening point, and hardens again after cooling.

After corresponding heating of the at least one conductor portion, the conductor arrangement can therefore be installed easily by hand, even in inaccessible or built-in regions as are typically found in an engine compartment of a motor vehicle. After cooling, the at least one conductor portion then retains the shape established during the installation. The conductor arrangement according to the present disclosure not only replaces the use of pre-bent, rigid solid conductors which are correspondingly difficult to handle in unfavorable installation space conditions owing to their lack of flexibility, but also makes it unnecessary to use an excessively high number of cable clips or an additional guide tube. The thermoplastic hard plastic sheath thus represents both an outer sleeve protecting the flexible conductor and a supporting skeleton which maintains the flexible internal conductor in the shape which has been established. The at least one conductor portion can, for example, be heated selectively at a desired bending point by means of a hot-air gun or, alternatively as a whole in an oven.

The thermoplastic hard plastic sheath has a bending strength of more than 50 N/mm² at an operating temperature of 25° C. It can hereby be a hard PVC, PA6 or the like. In such a case, depending on the additives contained, the softening point is approximately 80 to 150° C. In order to ensure that the at least one conductor portion retains its established shape, the bending strength of the hard plastic sheath should in the cooled state take account of the inherent restoring forces of the flexible internal conductor.

The flexible conductor, which extends in the at least one conductor portion, can be designed such that it can be deformed not only lengthwise but also with respect to its cross-section. In this case, the at least one conductor portion can, by corresponding heating and cooling, be changed from an essentially round state to a flattened one in which it can easily pass through, for example, slit-like regions and narrow places.

It is furthermore possible for the flexible internal conductor to be surrounded in at least one further adjoining conductor portion by a flexible protective sheath in the form of a corrugated tube, fabric hose or the like. The at least one further conductor portion serves typically to fit single- or multi-pole plug connectors or any other contacting elements, for example, in the form of high-power connectors such as cable lugs. The plug connectors are contacted electrically to the at least one further conductor portion by a respective crimped connection.

The flexible internal conductor can be a strand consisting of a plurality of individual bare wires. The flexible internal conductor can have a single-core or multi-core design, wherein each core is formed by an associated strand which is in turn surrounded by a flexible insulation. In addition, a metal braiding or a metal foil can be provided for the purpose of shielding from electromagnetic interference.

The flexible insulation or the flexible protective sheath can be made from soft PVC, PE, TEP, PTFE, silicone, silicone-coated fiberglass or the like. In this connection, the term "flexible" refers to a temperature range provided for continuous operation of the relevant conductor arrangement as most plastics harden at sufficiently low temperatures.

Depending on requirements and where the conductor arrangement is to be used, the flexible internal conductor can be produced from copper or aluminum. For weight and cost reasons, the use of aluminum has proven to be effective in the case of energy supply connections with correspondingly large conductor cross-sections, but does entail a high additional cost for the electrical contacting. It is in addition conceivable that the flexible internal conductor is a glass fiber for the purpose of optical data transmission.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
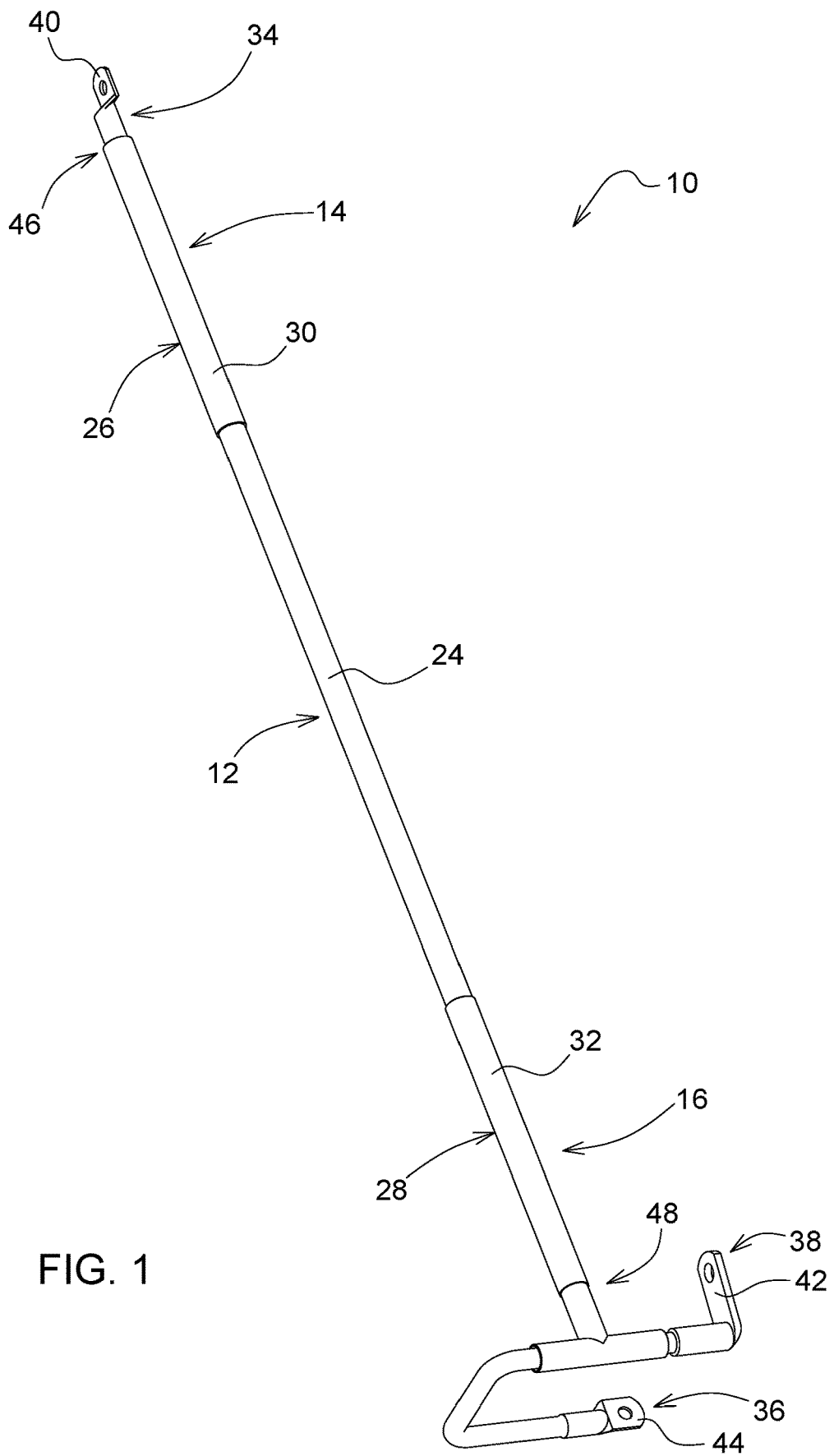
FIG. 1 shows a first embodiment of the conductor arrangement according to the present disclosure of a single-core electrical energy transmission connection.
Figure 2:
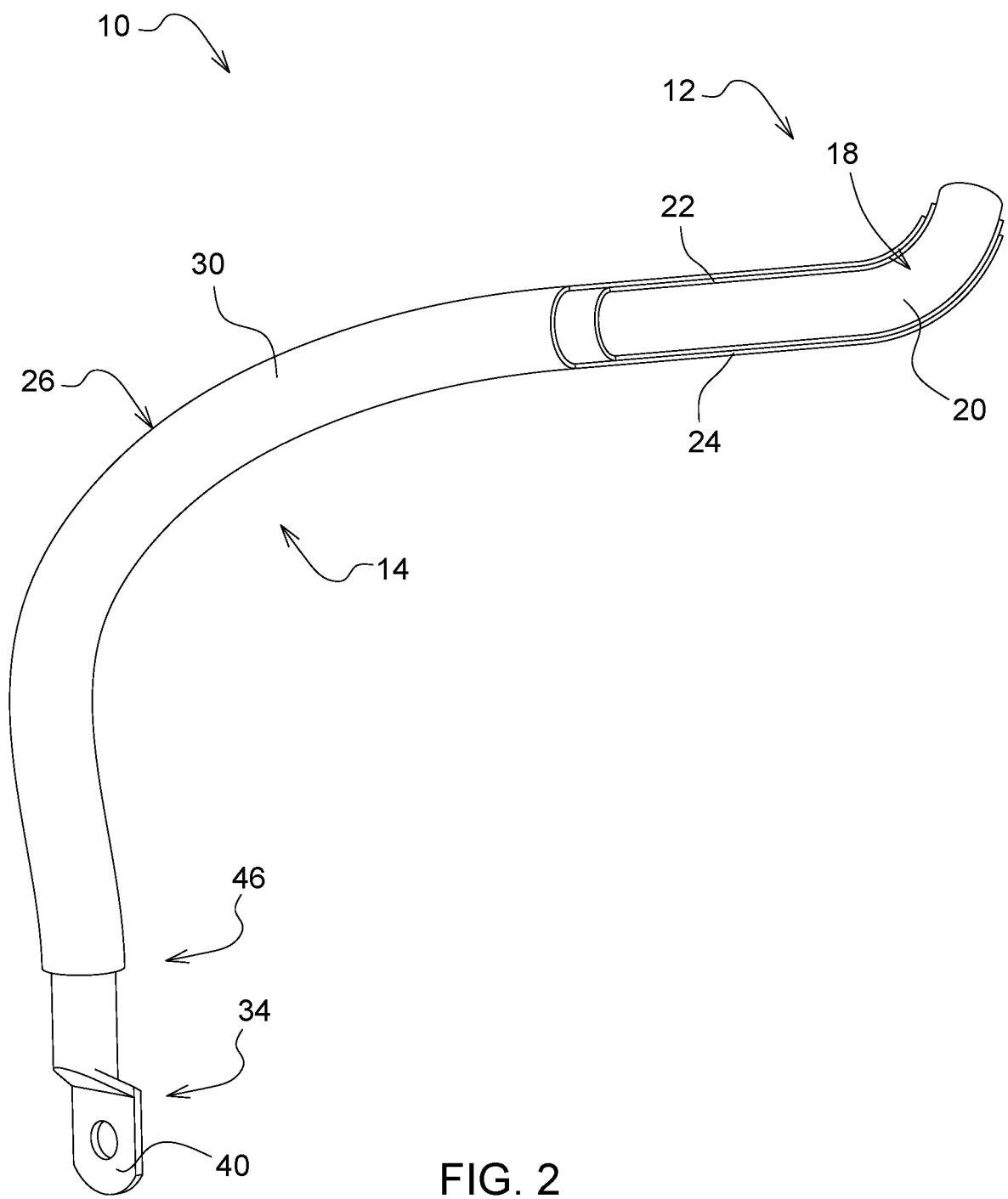
FIG. 2 shows a section view of the conductor arrangement of FIG. 1.

FIG. 1 shows a first embodiment of a conductor arrangement according to the present disclosure for the case of an electrical energy transmission connection. The conductor arrangement 10 includes a central first conductor portion 12 and outer second and third conductor portions 14, 16 adjoining the latter. As can be seen in FIG. 2, a continuous flexible internal conductor 18 extends inside the conductor portions 12, 14 and 16. The flexible internal conductor 18 is a copper strand 20 consisting of a plurality of individual bare wires. In the present case, the flexible internal conductor 18 has a single-core design and is surrounded by a flexible insulation layer 22. The flexible insulation layer 22 is made from soft PVC, PE, TEP, PTFE, silicone or silicone-coated fiberglass.

The flexible internal conductor 18 is surrounded in the region of the central first conductor portion 12 by a thermoplastic hard plastic sheath 24. The thermoplastic hard plastic sheath 24, or sheath layer, has a bending strength of more than 50 N/mm$^2$ at an operating temperature of 25° C. It may be a hard PVC, PA6 or the like.

The flexible internal conductor 18 is furthermore surrounded in the outer second and third conductor portion 14, 16 by a flexible protective sheath 26, 28 in the form of a corrugated tube 30, 32. The flexible protective sheath 26, 28, or sheath layer, is made from soft PVC, PE, TEP, PTFE, silicone or silicone-coated fiberglass. Alternatively, a fabric hose or the like can also be provided instead of a corrugated tube 30, 32. A plurality of contacting elements 34, 36, 38, which in the present case may be high-power connectors designed as cable lugs 40, 42, 44, are fitted at the outer second and third conductor portion 14, 16. The connectors are electrically contacted with the outer second and third conductor portion 14, 16 by a respective crimped connection 46, 48.

Figure 3:
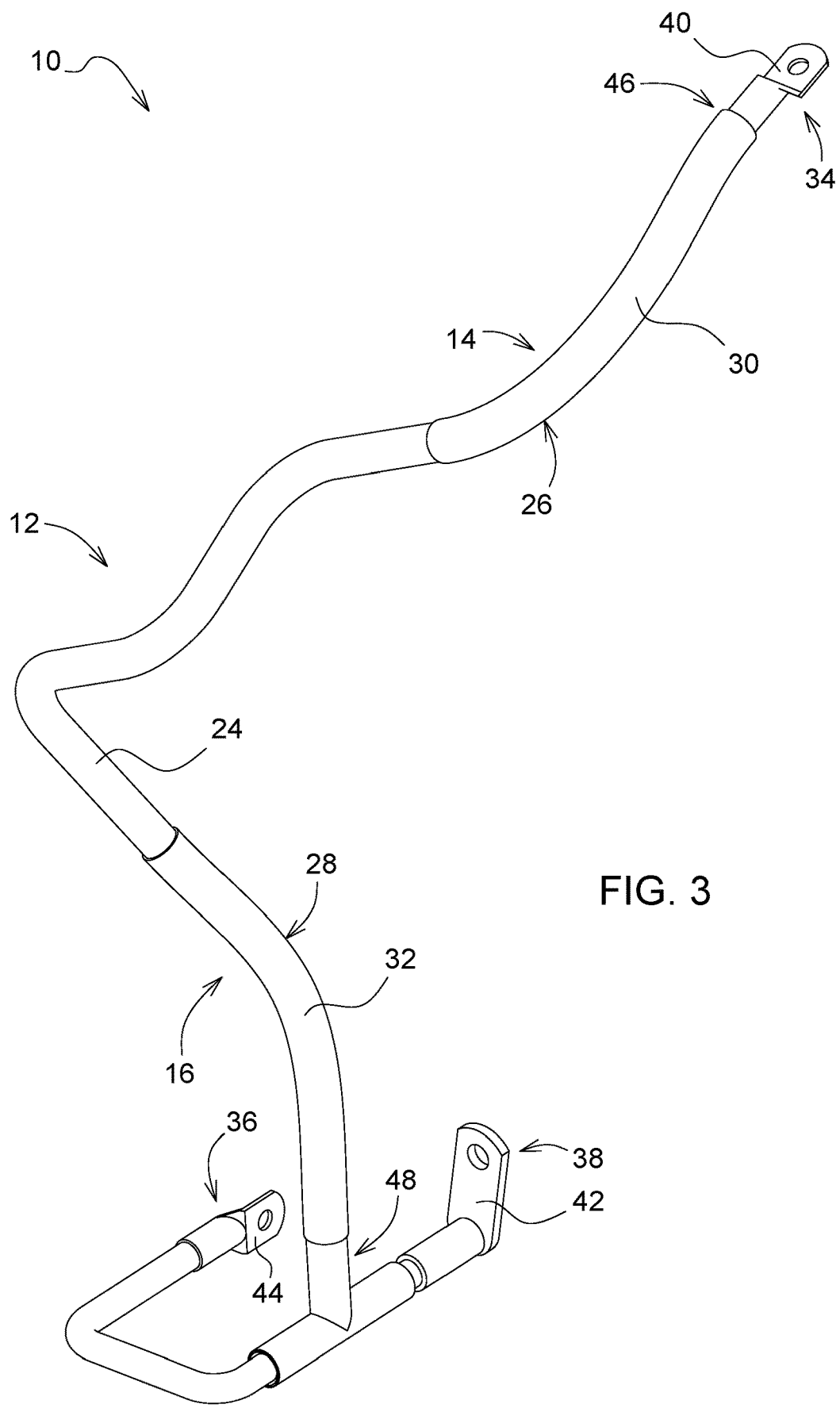
FIG. 3 shows the conductor arrangement of FIG. 1 after heating and shaping.

The thermoplastic hard plastic sheath 24 provided in the region of the central first conductor portion 12 can be transformed into a formable state by heating to a threshold temperature $T_g$ provided by a specific softening point. The central first conductor portion 12 is heated selectively at a desired bending point by means of a hot-air gun or alternatively as a whole in an oven. The conductor arrangement 10 can then be brought into the desired shape by hand for the purpose of installation, for example, inside an engine compartment of a motor vehicle. After cooling, the thermoplastic hard plastic sheath 24 hardens or stiffens again such that the central first conductor portion 12 retains its shape, shown by way of example in FIG. 3.

The thermoplastic hard plastic sheath 24 here represents both an outer sleeve protecting the flexible conductor 18 and also a supporting skeleton which maintains the flexible internal conductor 18 in the shape which has been established.

The softening point of the thermoplastic hard plastic sheath 24 is, depending on the additives contained, 80 to 150° C.

Figure 4:
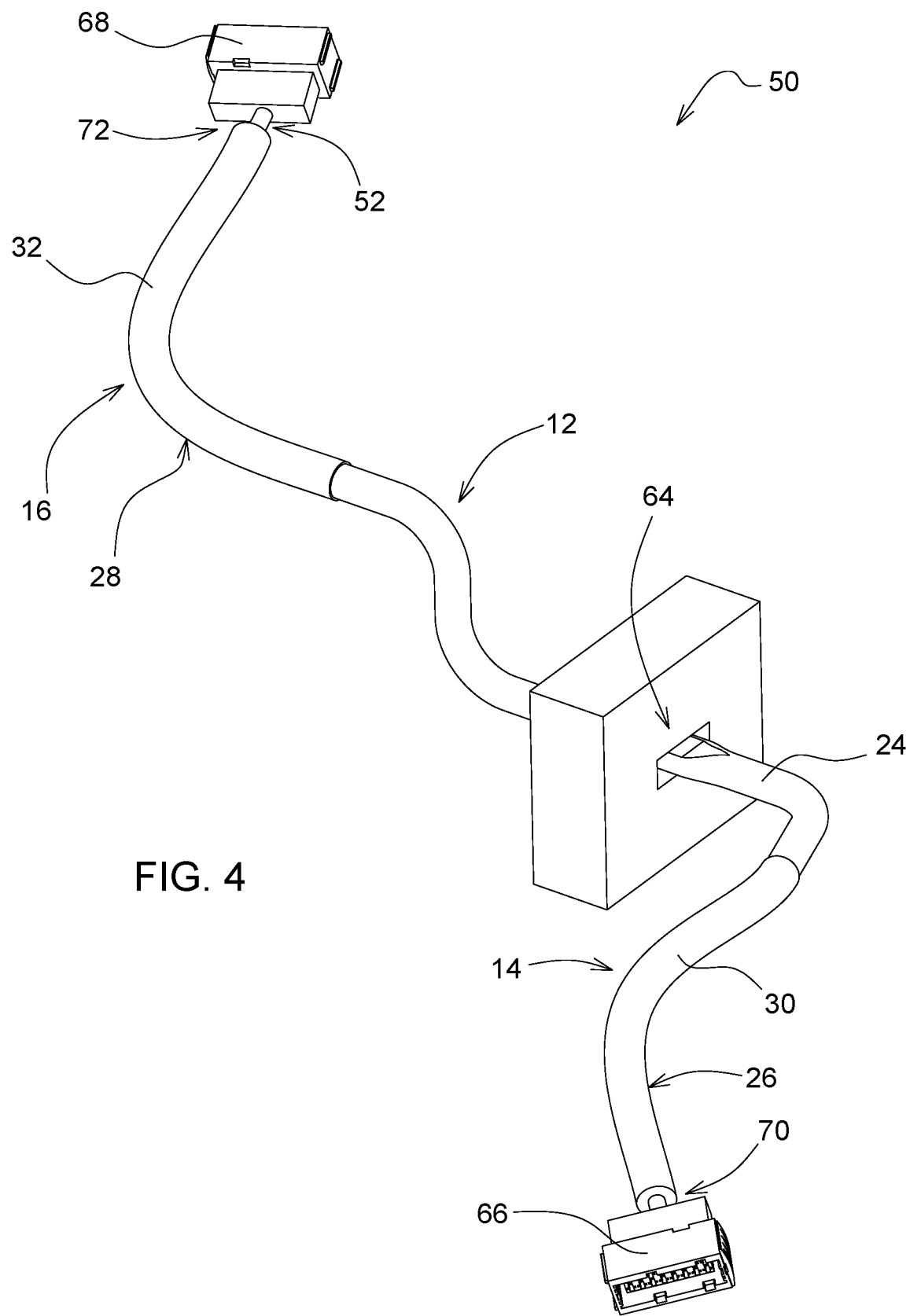
FIG. 4 shows a second embodiment of a conductor arrangement according to the present disclosure of a multi-core electrical data transmission connection.

FIG. 4 shows a second embodiment of a conductor arrangement according to the present disclosure for the case of an electrical data transmission connection.

Figure 5:
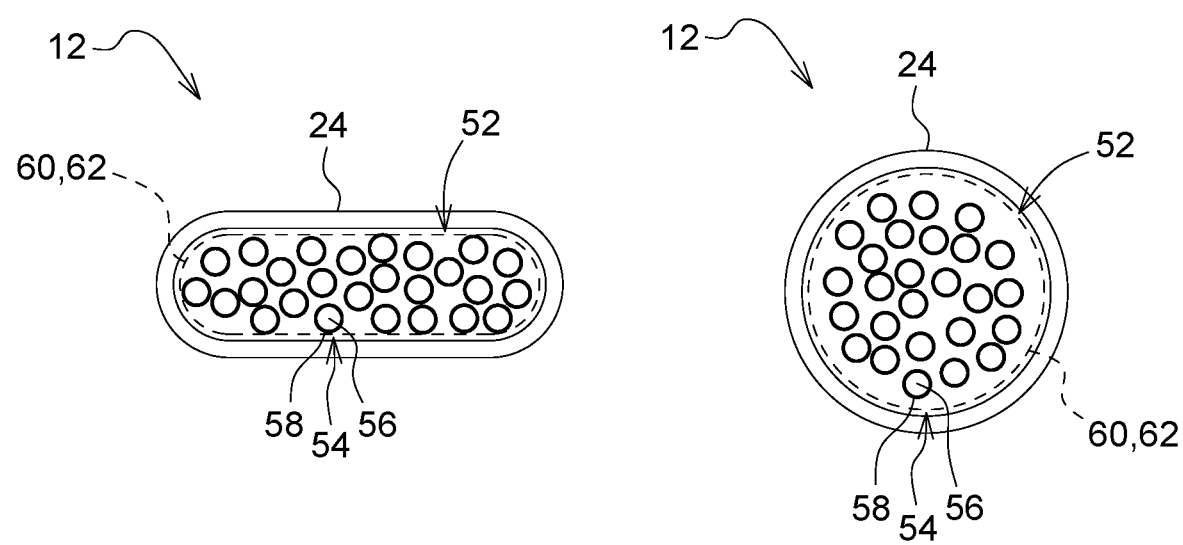
FIG. 5 shows a cross-sectional view of the conductor arrangement of FIG. 4.

The conductor arrangement 50 of the data transmission connection in FIG. 4 differs from that of the energy transmission connection of the first embodiment reproduced in FIG. 1 in that the flexible internal conductor 52 according to FIG. 5 has a multi-core structure. Each core 54 is formed by an associated copper strand 56 which in turn is surrounded by a flexible insulation layer 58. In addition, a metal braiding 60 or a metal film 62 indicated in FIG. 5 is provided for the purpose of shielding from electromagnetic interference.

The flexible internal conductor 52 extending in the central first conductor portion 12 is further designed in such a way that it can be deformed not only lengthwise but also with respect to its cross-section shown in FIG. 5. This is achieved by the individual cores 54 being bundled sufficiently loosely inside the surrounding thermoplastic hard plastic sheath 24. In this case, the central first conductor portion can, by corresponding heating and cooling, be changed from an essentially round state to a flattened one in which it can pass through a slit-like region 64 reproduced in FIG. 4 or a comparable narrow place.

Multi-pole plug connectors 66, 68 are fitted to the outer second and third conductor portions 14, 16, in accordance with the multi-core structure of the flexible internal conductor 52. The plug connectors 66, 68 are hereby electrically contacted with the outer second and third conductor portions 14, 16 via respective crimped connections 70, 72.

For the sake of completeness, it should be noted that the use of the conductor arrangement 10 or 50 is not limited to the field of vehicles. Instead, its use can also be envisaged in any other connection such as, for example, in the construction of devices or systems.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A conductor assembly for an electrical connection, comprising:
    a flexible multi-core internal conductor for data transmission, each core of the flexible multi-core internal conductor including a metal strand surrounded by a flexible insulation layer;
    an electromagnetic shield surrounding the flexible multi-core internal conductor;
    a thermoplastic hard plastic sheath surrounding a first portion of the flexible multi-core internal conductor; and
    a flexible corrugated tube surrounding a second portion of the flexible multi-core internal conductor;
    wherein a first portion of the thermoplastic hard plastic sheath includes an elongated flattened shape deformed lengthwise and with respect to a cross-section, a second portion of the thermoplastic hard plastic sheath includes an essentially round shape, and the second portion of the thermoplastic hard plastic sheath is adjacent the first portion of the thermoplastic hard plastic sheath;

the individual cores of the flexible multi-core internal conductor bundle loosely inside the electromagnetic shielding surrounded by the elongated flattened shape and the round shape of the thermoplastic hard plastic sheath.

2. The conductor assembly of claim 1, further comprising:
a first multi-pole plug connector connected to a first end of the flexible multi-core internal conductor; and
a second multi-pole plug connector connected to a second end of the flexible multi-core internal conductor.

3. The conductor assembly of claim 1, wherein the thermoplastic hard plastic sheath includes a bending strength of more than 50 N/mm2 at an operating temperature of 25° C.

4. The conductor assembly of claim 1, wherein the flexible internal conductor includes copper or aluminum.

5. The conductor assembly of 1, wherein the flexible insulation includes PVC, PE, TEP, PTFE, silicone or silicone-coated fiberglass.

\* \* \* \* \*